(12) United States Patent
Jen et al.

(10) Patent No.: US 7,238,640 B2
(45) Date of Patent: Jul. 3, 2007

(54) MINIMIZATION OF PURGE $NO_x$ RELEASE FROM $NO_x$ TRAPS BY OPTIMIZING THE OXYGEN STORAGE CAPACITY

(75) Inventors: Hungwen Jen, Troy, MI (US); Gopichandra Surnilla, West Bloomfield, MI (US); Christian Goralski, Jr., Ypsilanti, MI (US); Joseph Theis, Rockwood, MI (US); Justin Ura, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 502 days.

(21) Appl. No.: 10/707,659

(22) Filed: Dec. 30, 2003

(65) Prior Publication Data

US 2005/0148463 A1 Jul. 7, 2005

(51) Int. Cl.
*B01J 23/00* (2006.01)
*B01J 21/00* (2006.01)
*B01J 20/00* (2006.01)

(52) U.S. Cl. ............... 502/325; 502/326; 502/327; 502/328; 502/330; 502/332; 502/333; 502/334; 502/339; 502/302; 502/303; 502/304; 502/527.12; 502/527.13

(58) Field of Classification Search ........ 502/325–328, 502/330, 332–334, 339, 302–304, 527.12, 502/527.13
See application file for complete search history.

(56) References Cited

U.S. PATENT DOCUMENTS

| | | | |
|---|---|---|---|
| 5,492,878 A | * | 2/1996 | Fujii et al. ............... 502/304 |
| 5,948,376 A | * | 9/1999 | Miyoshi et al. .......... 423/213.5 |
| 6,358,880 B1 | | 3/2002 | Hedouin et al. |
| 6,395,675 B1 | * | 5/2002 | Suga et al. ................. 502/326 |
| 6,413,483 B1 | * | 7/2002 | Brisley et al. ............ 423/239.1 |
| 6,468,941 B1 | * | 10/2002 | Bortun et al. .............. 502/300 |
| 6,499,294 B1 | | 12/2002 | Katoh et al. |
| 6,677,272 B2 | * | 1/2004 | Beall et al. ................ 502/439 |
| 6,897,182 B2 | * | 5/2005 | Cutler et al. ............... 502/302 |
| 2002/0013226 A1 | * | 1/2002 | Maunula ..................... 502/302 |
| 2002/0015674 A1 | * | 2/2002 | Taniguchi et al. ....... 423/213.2 |
| 2002/0048542 A1 | * | 4/2002 | Deeba et al. ............ 423/239.1 |
| 2002/0051122 A1 | * | 5/2002 | Kakuta et al. ............... 353/98 |

(Continued)

FOREIGN PATENT DOCUMENTS

EP 0 666 103 A1 8/1995

(Continued)

*Primary Examiner*—Cam N. Nguyen
(74) *Attorney, Agent, or Firm*—Damian Porcari; Brooks Kushman P.C.

(57) ABSTRACT

The present invention provides a catalyst for use in a $NO_x$ trap that has reduced $NO_x$ release during rich purges, increased NO conversion efficiency under stoichiometric conditions, and improved sulfur tolerance. The catalyst of this embodiment includes a precious metal, an oxygen storage component in contact with the precious metal, and a $NO_x$ storage material. The oxygen storage component in contact with the precious metal is present in an amount that provides sufficient oxygen storage capacity to reduce the $NO_x$ release from the $NO_x$ trap during rich purges to less than 20% of the $NO_x$ that is stored in the $NO_x$ trap across the operating temperature window of the $NO_x$ trap, increase the $NO_x$ conversion efficiency under stoichiometric conditions to a value greater than 70%, and increase the sulfur tolerance of the $NO_x$ trap.

32 Claims, 3 Drawing Sheets

U.S. PATENT DOCUMENTS

2002/0131914 A1* 9/2002 Sung .......................... 422/177
2003/0021745 A1* 1/2003 Chen ....................... 423/239.1
2003/0040432 A1* 2/2003 Beall et al. ................. 502/332
2004/0048741 A1* 3/2004 Poulston et al. ............ 502/302
2004/0198595 A1* 10/2004 Chen ......................... 502/328
2006/0100097 A1* 5/2006 Chigapov et al. ........... 502/304

FOREIGN PATENT DOCUMENTS

GB          2 258 146 A          2/1993

* cited by examiner

MINIMIZATION OF PURGE $NO_x$ RELEASE FROM $NO_x$ TRAPS BY OPTIMIZING THE OXYGEN STORAGE CAPACITY

BACKGROUND OF INVENTION

1. Field of the Invention

In at least one aspect, the present invention relates to $NO_x$ traps with reduced $NO_x$ release during rich purges, increased $NO_x$ conversion efficiency under stoichiometric conditions, and improved sulfur tolerance and desulfation capability.

2. Background Art

Current three-way catalysts are effective for converting the HC, CO, and $NO_x$ in the exhaust into $CO_2$, $H_2O$, and $N_2$ when the air fuel ("A/F") ratio is controlled about the stoichiometric mixture of 14.6 to 1. With the closed-loop control systems used in modern vehicles, the A/F ratio actually alternates between a slightly lean condition and a slightly rich condition with a frequency of about 1-2 Hz and at an amplitude of approximately 0.3 to 0.5 A/F ratio units. To provide high three-way conversion in this oscillatory environment, three-way catalysts usually contain oxides of cerium or mixed oxides of cerium and zirconium. For the short periods of slightly lean exhaust, the cerium is able to adsorb the excess oxygen, allowing the $NO_x$ reduction to continue. The cerium also releases oxygen during the short periods of slightly rich exhaust, providing oxidants for converting the HC and CO. The combination of tight A/F ratio control near stoichiometry and the modern three-way catalyst provide very high conversion efficiencies of the HC, CO, and $NO_x$ and allow automakers to satisfy stringent emission legislation in markets around the world.

It is desirable to operate the engine lean in order to improve the fuel economy. By opening up the air throttle plate and operating the engine with excess air, the pumping losses across the throttle plate are reduced and the thermodynamic efficiency of the engine is improved, resulting in decreased fuel consumption. However, the exhaust from such an engine contains large amounts of excess oxygen for extended periods of time (e.g., 30-60 seconds), and current three-way catalysts are unable to provide the $NO_x$ control necessary to satisfy stringent emission legislation in this environment.

One potential solution to this emission and fuel economy dilemma is to use a lean $NO_x$ trap. Lean $NO_x$ traps are three-way catalysts and, like all such catalysts, can store $NO_x$ under lean conditions for limited periods of time. $NO_x$ traps contain alkaline earth or alkali metals to enhance their $NO_x$ storage capabilities under lean conditions. Such catalysts can store $NO_x$ with high efficiency for a period of time on the order of 60 seconds. Periodically, as the $NO_x$ capacity of the $NO_x$ trap is approached, the A/F ratio must be driven to a rich condition for a few seconds in order to purge and reduce the stored $NO_x$ and regenerate the $NO_x$ storage capacity of the trap.

One of the characteristic features of lean $NO_x$ traps is that they are most effective at storing $NO_x$ in a temperature window that can vary somewhat with the formulation but is typically between 200° C. and 550° C. As a result of this temperature sensitivity, the $NO_x$ traps are typically placed in the underfloor location in the exhaust. Lightoff catalysts can be placed close to the exhaust manifold to provide fast lightoff during a cold-start. These lightoff catalysts can be formulated with little or no oxygen storage capacity ("OSC") in order to minimize the fuel required to purge and regenerate the lean $NO_x$ trap.

Lean $NO_x$ traps can provide very high conversion of $NO_x$ when the engine is operated with an A/F ratio control strategy consisting of extended periods of lean operation with periodic rich purges. However, the catalyst system is also expected to provide high three-way conversion when the A/F ratio is controlled at stoichiometry, for example during high load operation. If the close-coupled catalysts contain low amounts of OSC, this limits the ability of these catalysts to convert CO and $NO_x$ under stoichiometric conditions. Therefore, unless there is a cerium-containing three-way catalyst downstream of the $NO_x$ trap, the $NO_x$ trap itself must contain some OSC in order to provide high CO and $NO_x$ conversion under the oscillatory A/F conditions characteristic of closed-loop control systems.

The presence of cerium in the $No_x$ trap has been observed to provide other benefits besides improving the stoichiometric performance of the trap. The cerium can improve the sulfur tolerance of the trap by adsorbing some of the sulfur and preventing that portion of the sulfur from poisoning the $NO_x$ storage sites. The cerium also improves the desulfation characteristics of the trap by promoting the water-gas-shift (WGS) reaction. The WGS reaction produces additional hydrogen, which has been shown to be the best agent for desulfating the poisoned trap. In addition, the presence of cerium can improve the $NO_x$ storage capability at low temperatures, as cerium is able to provide some $NO_x$ storage capacity at low temperatures (e.g., 300° C.). Finally, the cerium can be beneficial for the thermal durability of the trap, as ceria is known to stabilize the dispersion of the precious metals.

However, the presence of cerium in the trap can also be responsible for some undesirable effects. As with the lightoff catalysts, cerium in the trap requires additional reductants (i.e., HC, CO, $H_2$) to purge the $NO_x$ trap, increasing the fuel penalty associated with the purges. A second undesirable effect, which is the subject of this invention, is that the oxygen storage capacity provided by the cerium can cause some of the stored $NO_x$ to be released from the trap during the purges without being reduced to $N_2$. This purge $NO_x$ release is particularly evident at temperatures of 350° C. and above. A major source of this $NO_x$ release is attributed to the exotherm that results from the reaction between the reductants in the exhaust and oxygen from the cerium during the transition from lean operation to the rich purge condition.

Accordingly, there exists a need for a lean $NO_x$ trap with a balanced amount of oxygen storage capacity that results in low levels of purge $NO_x$ release but still provides high $NO_x$ conversion under stoichiometric conditions and resistance to sulfur poisoning.

SUMMARY OF INVENTION

The present invention overcomes the problems of the prior art by providing in one embodiment a catalyst for use in a $NO_x$ trap that has reduced $NO_x$ release during the rich purges, increased $NO_x$ conversion efficiency under stoichiometric conditions, and improved sulfur tolerance and desulfation capability. The catalyst of this embodiment includes a precious metal, an oxygen storage component in contact with the precious metal, and a $NO_x$ storage material. The oxygen storage component in contact with the precious metal is present in an amount that provides a level of oxygen storage capacity that limits the $NO_x$ release from the $NO_x$ trap during the rich purges to less than 20% of the $NO_x$ that is stored in the $NO_x$ trap across the operating temperature window of the trap. However, the oxygen storage component is present in an amount that provides sufficient oxygen storage capacity to increase the $NO_x$ conversion efficiency under stoichiometric conditions to a value greater than 70%. Moreover, the oxygen storage component is present in an amount that provides sufficient oxygen storage capacity to increase the sulfur tolerance of the $NO_x$ trap. Finally, the oxygen storage component is present in an amount that provides sufficient oxygen storage capacity to improve the desulfation capability of the $NO_x$ trap.

DETAILED DESCRIPTION

Figure 1:
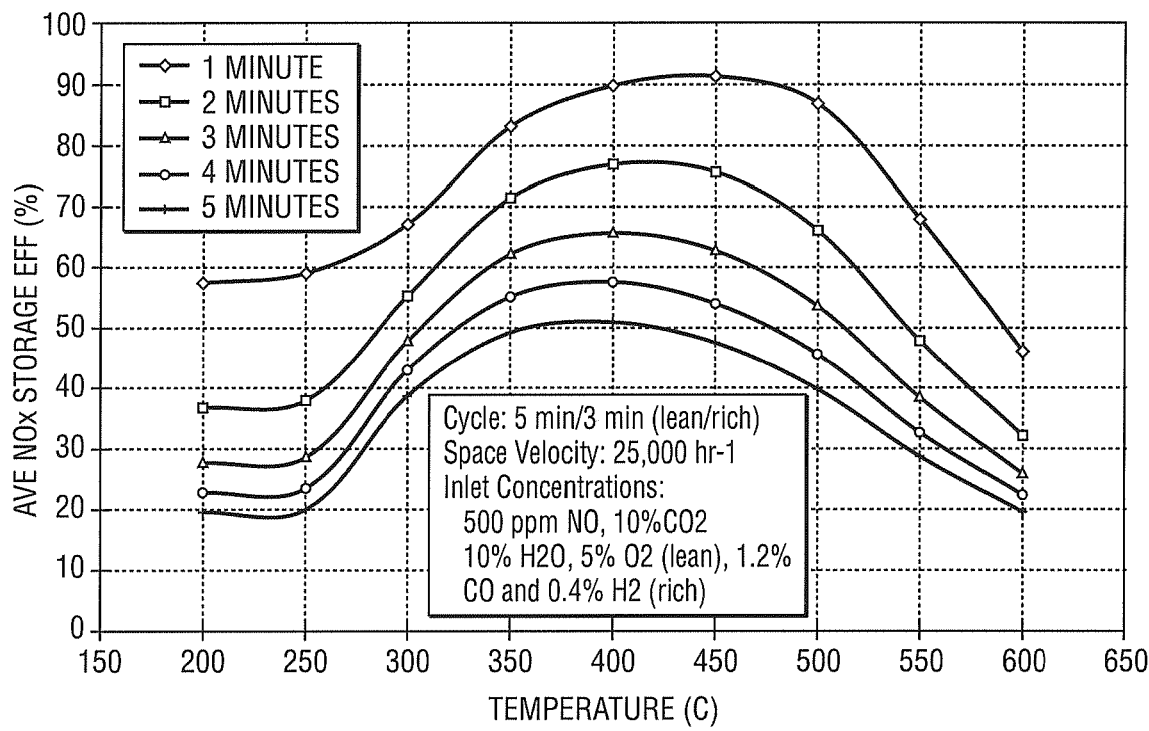
FIG. 1 is a series of plots of the $NO_x$ storage efficiency of a thermally aged $NO_x$ trap versus temperature for various lean storage times.

Reference will now be made in detail to presently preferred compositions or embodiments and methods of the invention, which constitute the best modes of practicing the invention presently known to the inventors.

In one embodiment of the present invention, a catalyst for use in a $NO_x$ trap is provided. The catalyst of this embodiment includes a precious metal, an oxygen storage component in contact with the precious metal, and a $NO_x$ storage material. The oxygen storage component in contact with the precious metal is present in an amount that provides sufficient oxygen storage capacity at 500° C. to limit the $NO_x$ release from the $NO_x$ trap during the rich purges to less than 20% of the $NO_x$ that is stored in the $NO_x$ trap across the operating temperature window of the trap and yet increases the $NO_x$ conversion efficiency under stoichiometric conditions to a value greater than 70%. The operating temperature window is the temperature range over which the trap stores $NO_x$. Typically this range is from about 200° C. to about 550° C. More preferably, this range is from about 250° C. to about 500° C. Moreover, the oxygen storage component is present in an amount that provides sufficient oxygen storage capacity to increase the sulfur tolerance of the $NO_x$ trap. In particular, the increase sulfur tolerance is increased such that the drop in the average $NO_x$ storage efficiency for one minute of lean operation is less than 30% when the $NO_x$ trap is contacted with a gaseous composition containing about 9 ppm sulfur dioxide at 400° C. for 10 hours.

The oxygen storage component may be made from a number of different materials known to those skilled in the art of catalytic converters. An important feature of the oxygen storage component is that its ability to store oxygen is modulated by being in contact with the precious metal. Specifically, the oxygen storage capacity at temperatures below 700° C. is increased significantly by being in contact with precious metal. Preferably, the oxygen storage component comprises one or more oxides selected from the group consisting of Rare Earth metal oxides, Group III metal oxides, Group IV metal oxides, and Group V metal oxides. Accordingly, the oxygen storage component may be either a pure metal oxide or a mixed oxide (binary oxide, ternary oxides, etc.) Ceria and mixed oxides containing ceria are most preferred. Preferred precious metals to be used in the catalyst of the invention include platinum, palladium, rhodium, ruthenium, or mixtures thereof. More preferably, the precious metal includes platinum, palladium, rhodium, and mixtures thereof. Finally, the $NO_x$ storage material preferably comprises a component selected from the group consisting of an alkaline earth metal, an alkali metal, and mixtures thereof.

The catalyst of the present embodiment may be made by a number of processes known to those skilled in the art. For example, the catalyst may be applied to a support material such as cordierite by a washcoat and then calcined at high temperature. Preferably, such a washcoat will include 10 wt % to about 25 wt % of the oxygen storage component and sufficient precious metal to form a catalyst having from about 5 to about 150 grams of precious metal per cubic foot of catalyst formed. Specifically, the catalysts of the present embodiment are made by adding alumina to water along with the proper amount of a mixed oxide(s) that produces the desired concentration of mixed oxide in the final catalyst. These materials are mixed to form a slurry. The slurry is milled with nitric acid and some additional water and then coated onto a brick (e.g., a cordierite substrate) which is then calcined in air at 450° C. The calcined brick is impregnated with a solution of the salts of the desired precious metals and the $NO_x$ adsorber materials. The brick is calcined again in air at 450° C. to fix the precious metals and $NO_x$ adsorber materials to the washcoat.

It should be appreciated that it is not the amount of oxygen storage component per se which leads to the advantages of the present embodiment in reducing the $NO_x$ release during the rich purges, increasing the $NO_x$ conversion efficiency under stoichiometric conditions, and increasing the sulfur tolerance. Instead, it is the oxygen storage capacity that is the focus of this embodiment (i.e., the amount of oxygen that the catalyst is able to store expressed as micromoles of oxygen per gram of catalyst). When such oxygen storage components are not in contact with the precious metal, the oxygen storage capacity of the oxygen storage component is low at temperatures below 700° C. As the oxygen storage component comes in closer spatial contact with the oxygen storage component, the amount of oxygen that the oxygen storage component and the catalyst are able to store at temperatures below 700° C. increases.

Figure 3:
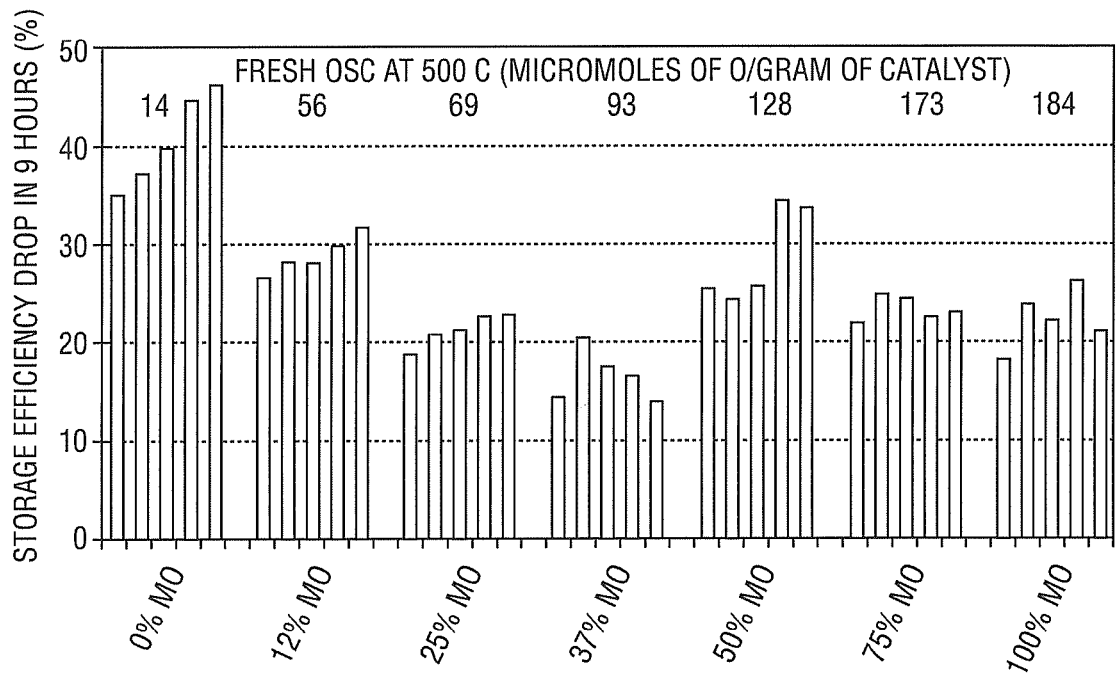
FIG. 3 is a bar chart showing the drop in the average $NO_x$ storage efficiency for one minute of lean operation after 9 hours with 9 ppm $SO_2$ at 400° C. for $NO_x$ traps with different levels of a cerium-containing mixed oxide.

The selection of the proper amount of oxygen storage capacity of the catalyst of the present embodiment is determined by consideration of a number of factors. Oxygen storage capacity improves the sulfur tolerance of the $NO_x$ trap. Presumably, sulfur tolerance is improved by the adsorption of some of the sulfur onto the oxygen storage materials, which prevents that portion of the sulfur from poisoning the $NO_x$ storage sites. FIG. 3 shows the sulfur poisoning results for $NO_x$ traps containing various amounts of a cerium-containing mixed oxide. The figure shows the drop in average $NO_x$ storage efficiency for one minute of lean operation between 0 hours and 9 hours for traps that were poisoned five times each at 400° C. with 9 ppm $SO_2$. After each poisoning run, the traps were desulfated at high temperatures to remove the sulfur and regenerate the trap.

FIG. 3 shows that the drop in storage efficiency over the 9 hours of poisoning decreased as the content of mixed oxide was increased from 0% to 37%; no further improvement was observed with higher contents of mixed oxide. The trap with no mixed oxide had an average drop in $NO_x$ storage efficiency of about 40%, while the trap with 37% mixed oxide had an average drop in $NO_x$ storage efficiency of about 16%. These results indicate that the presence of cerium in the $NO_x$ trap improves the sulfur tolerance of the trap. Moreover, the ceria improves the desulfation characteristics of the trap by promoting the water-gas-shift ("WGS") reaction. The WGS reaction produces additional hydrogen, which has been shown to be the best agent for desulfating the poisoned trap. The presence of the oxygen storage component (e.g. ceria) can also improve the $NO_x$ storage capability at low temperatures, as cerium is able to provide some $NO_x$ storage capacity at low temperatures (e.g., 300° C.). Finally, the oxygen storage component can also be beneficial for the thermal durability of the trap. For example, ceria is known to stabilize the dispersion of the precious metals.

However, the presence of too high an oxygen storage capacity can lead to a number of undesirable effects. For example, as with the lightoff catalysts, ceria in the trap requires additional reductants (i.e., HC, CO, $H_2$) to purge the $NO_x$ trap during the purges, increasing the fuel penalty associated with the purges. Additionally, oxygen storage capacity can cause some of the stored $NO_x$ to be released from the trap during the purges without being reduced to $N_2$. This purge $NO_x$ release is particularly evident at temperatures of 350° C. and above. Accordingly, it has been discovered that the purge $NO_x$ release can be reduced while maintaining good $NO_x$ conversion during stoichiometric operation and good sulfur tolerance when the precious metal and the oxygen storage component are in a sufficient amount and in sufficient contact that the oxygen storage capacity of the $NO_x$ trap is from about 30 micromoles of oxygen per gram of catalyst to about 90 micromoles of oxygen per gram of catalyst at 500° C. More preferably, the oxygen storage capacity of the $NO_x$ trap at 500° C. is from about 40 micromoles of oxygen per gram of catalyst to about 80 micromoles of oxygen per gram of catalyst; and most preferably, the oxygen storage capacity of the $NO_x$ trap at 500° C. is about 60 micromoles of oxygen per gram of catalyst.

In a variation of the present embodiment, the proper amount of the oxygen storage component in contact with the precious metal is attained by limiting the physical contact between the precious metal catalyst and the oxygen storage component. This may be achieved by layering of the catalyst of the invention is such a manner that most of the precious metal is in a first layer and most of the oxygen storage component is in a second layer. The catalyst of this variation may have the precious metal in a first layer disposed over a substrate and the oxygen storage component is contained in a second layer disposed over the first layer. Accordingly, the contact between the precious metal and the oxygen storage component is limited to an interface between the first layer and the second layer.

In another variation, the contact between the precious metal and the oxygen storage component is limited by combining the precious metal and the oxygen storage component in a single layer. In this variation the benefits of the present invention are achieved by having an amount of oxygen storage component that reduces the $NO_x$ release during the rich purges, increases the $NO_x$ conversion efficiency under stoichiometric conditions, and increases the sulfur tolerance as set forth above. The single layer of this embodiment will preferably also include the $NO_x$ storage material.

In yet another variation of this embodiment, the oxygen storage capacity of the $NO_x$ trap is limited by altering the physical form of the oxygen storage component so that the oxygen storage component has less oxygen storage capacity in general. This variation is particularly useful when the oxygen storage component is a mixed oxide as set forth above. Such an alteration of the oxygen storage component may be realized by utilizing a pre-sintered oxide of the oxides set forth above, where the mixed oxide has been heated to temperatures greater than 500° C. to reduce its surface area and therefore its oxygen storage capacity. Those skilled in the art will also recognize other ways of limiting the OSC (i.e., reducing surface area) that include for example chemical methods such as acid treatment. The preferred pre-sintered oxide is a pre-sintered ceria.

In another variation of the present invention, a catalyst for use in a $NO_x$ trap is provided. The catalyst of this embodiment includes a precious metal, an oxygen storage component in contact with the precious metal in an amount such that oxygen storage capacity of the $NO_x$ trap at 500° C. is from about 30 micromoles of oxygen per gram of catalyst to about 90 micromoles of oxygen per gram of catalyst, and a $NO_x$ storage material. More preferably, the oxygen storage capacity of the $NO_x$ trap at 500° C. is from about 40 micromoles of oxygen per gram of catalyst to about 80 micromoles of oxygen per gram of catalyst; and most preferably, the oxygen storage capacity of the $NO_x$ trap at 500° C. is about 60 micromoles of oxygen per gram of catalyst. The selection and the amounts of the precious metal, the oxygen storage component, and the $NO_x$ storage material is the same as set forth above. Moreover, the amount of oxygen storage is limited in the same manner as set forth above. Specifically, the desired oxygen storage capacity is attained by limiting the contact between the precious metal catalyst and the oxygen storage component. Again, this is achieved by having the precious metal (all or most of) contained in a first layer disposed over a substrate and the oxygen storage component is contained in a second layer disposed over the first layer (all or most of). Similarly, the contact between the precious metal and the oxygen storage component is limited to an interface between the first layer and the second layer. Alternatively, the precious metal and the oxygen storage component are combined in a single layer as set forth above. Finally, the oxygen storage component in contact with the precious metal may also be limited by reducing the oxygen storage capacity of the oxygen storage component utilizing pre-sintered material (i.e., pre-sintered mixed oxides).

In a particularly preferred embodiment of the present invention, a catalyst for use in a $NO_x$ trap is provided. The catalyst of this embodiment comprises a precious metal, ceria, and a $NO_x$ storage material. The ceria must be in contact with the precious metal in an amount that provides sufficient oxygen storage capacity to reduce the Purge $NO_x$ release from the $NO_x$ trap during the rich purges to less than 20% of the $NO_x$ that is stored in the $NO_x$ trap across the operating temperature window of the $NO_x$ trap, increase the $NO_x$ conversion efficiency under stoichiometric conditions to a value greater than 70%, and increase the sulfur tolerance such that the drop in the average $NO_x$ storage efficiency for one minute of lean operation is less than 30% when the $NO_x$ trap is contacted with a gaseous composition containing about 9 ppm sulfur dioxide at 400° C. for 10 hours. The selection and amounts of the precious metal and the $NO_x$ storage material are the same as set forth above. Moreover, the various mechanisms and variations for limiting the ceria in contact with the precious metal are also the same as above. In particular, the amount of ceria in contact with the precious metal will be such that the oxygen storage capacity of the catalyst is from about 30 micromoles of oxygen per gram of catalyst to about 90 micromoles of oxygen per gram of catalyst at 500° C. More preferably, the amount of ceria in contact with the precious metal will be such that the oxygen storage capacity of the catalyst is from about 40 micromoles of oxygen per gram of catalyst to about 80 micromoles of oxygen per gram of catalyst at 500° C.; and most preferably, the amount of ceria in contact with the precious metal will be such that the oxygen storage capacity of the $NO_x$ trap is about 60 micromoles of oxygen per gram of catalyst at 500° C.

The following examples illustrate the various embodiments of the present invention. Those skilled in the art will recognize many variations that are within the spirit of the present invention and scope of the claims.

Figure 2:
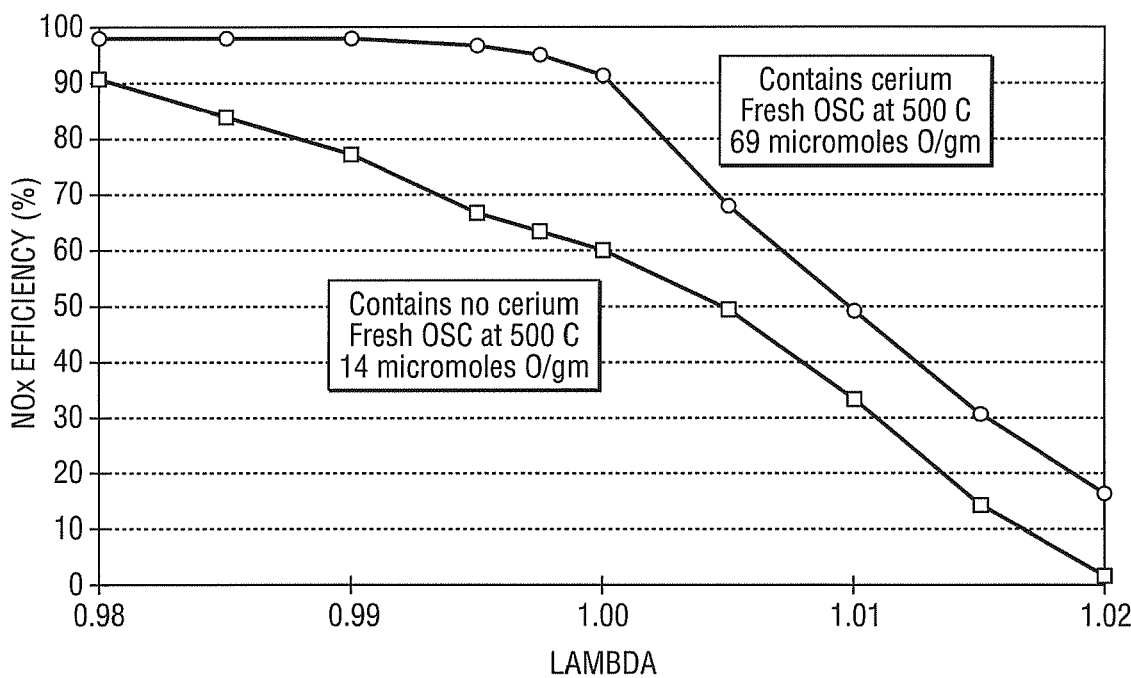
FIG. 2 is a plot of the $NO_x$ Efficiency versus lambda value at 500° C. for $NO_x$ traps with and without cerium after high temperature aging.

FIG. 1 shows the $NO_x$ storage efficiency averaged over 1, 2, 3, 4, and 5 minutes of lean operation for a thermally aged lean $NO_x$ trap when evaluated on a five minute lean/3 minute rich test cycle. The peak $NO_x$ storage performance occurs around 400° C. to 450° C. and drops off at lower and higher temperatures. FIG. 2 shows that a $NO_x$ trap containing cerium has much better $NO_x$ conversion at stoichiometry (lambda=1.0, where lambda is the ratio of the actual A/F ratio and the A/F ratio at stoichiometry) than a trap without cerium after the traps were aged on a high temperature schedule with maximum temperatures near 1000° C. The figure also indicates the oxygen storage capacities measured at 500° C. for samples of these catalysts that were stabilized at 600° C. Here the sample was reduced for 30 seconds in 1% CO and then oxidized for 30 seconds in 0.5% O2. The OSC was determined from the amount of oxygen taken up during the 30 second lean period and then normalized by the weight of the sample.

With reference to FIG. 3 a bar chart showing the drop in the average $NO_x$ storage efficiency for one minute of lean operation after 9 hours with 9 ppm $SO_2$ at 400° C. for $NO_x$ traps with different levels of a cerium-containing mixed oxide is provided. Prior to exposure to $SO_2$, the traps were exposed to 2 hours of high temperature aging in order to stabilize their performance. The poisoning test consisted of a one minute lean/one minute rich cycle, and the $NO_x$ storage efficiencies were averaged over the one minute of lean operation. The figure shows the drop in average $NO_x$ storage efficiency between 0 hours and 9 hours for traps that were poisoned five times each at 400° C. with 9 ppm $SO_2$. After each poisoning run, the traps were desulfated at high temperatures to remove the sulfur and regenerate the trap. FIG. 3 shows that the drop in storage efficiency over the 9 hours of poisoning decreased as the content of mixed oxide was increased from 0% to 37%; no further improvement was observed with higher contents of mixed oxide. The trap with no mixed oxide had an average drop in $NO_x$ storage efficiency of about 40%, while the trap with 37% mixed oxide had an average drop in $NO_x$ storage efficiency of about 16%. These results indicate that the presence of cerium in the $NO_x$ trap improves the sulfur tolerance of the trap. FIG. 3 also shows the oxygen storage capacities measured at 500° C. for samples of these catalysts that were stabilized at 600° C.

Figure 4:
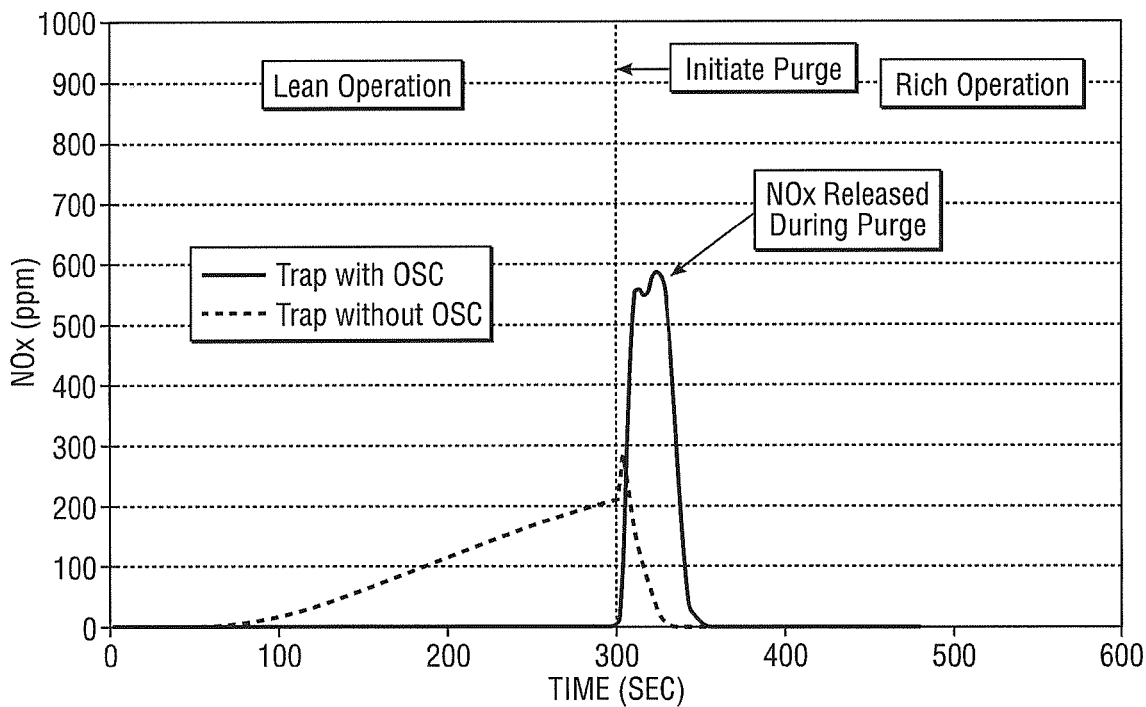
FIG. 4 is a plot of $NO_x$ storage and release performance at 350° C. for stabilized traps with and without cerium.
Figure 5:
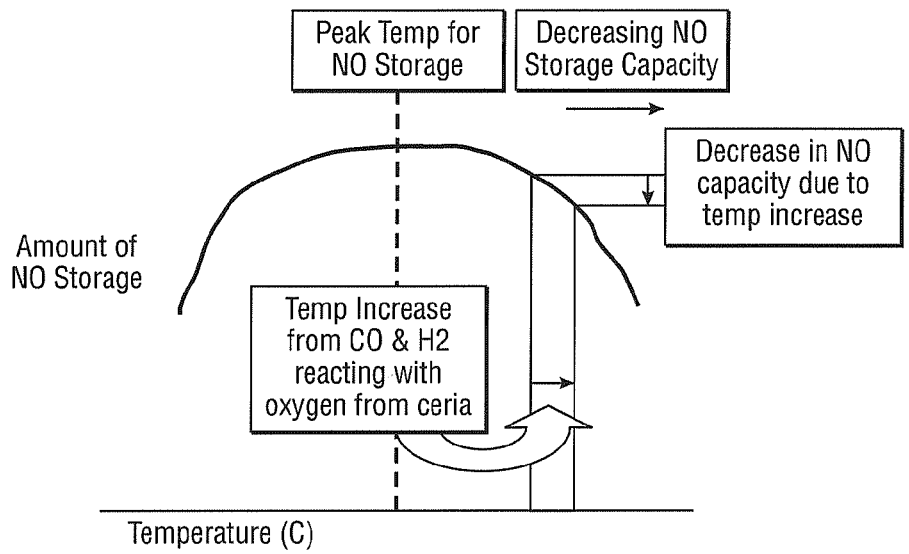
FIG. 5 is a pictorial representation demonstrating the release of $NO_x$ from a $NO_x$ trap at high temperatures by the exotherm produced by the reaction of the reductants with oxidized ceria immediately following the lean-to-rich transition during a rich purge.

With reference to FIG. 4, plots of $NO_x$ storage and release performance at 350° C. for stabilized traps with and without cerium are provided. These traps were evaluated at 350° C. using a 5 minute lean/3 minute rich cycle. While the trap without OSC was less effective at storing $NO_x$ during the 5 minute lean period, it exhibited much less $NO_x$ release during the purge than the trap containing OSC. The $No_x$ release may better be understood by reference to FIG. 5 which is a pictorial representation demonstrating the release of $NO_x$ from a $NO_x$ trap at high temperatures by the exotherm produced by the reaction of the reductants with oxidized ceria immediately following the lean-to-rich transition during the rich purge. This heats up the local area of the washcoat around the cerium site, including any $NO_x$ storage sites nearby. When the temperature before the purge is near or above the temperature for maximum $NO_x$ storage capacity (i.e., in the range of decreasing $NO_x$ capacity) and the amount of $NO_x$ stored is near the capacity of the trap at that temperature, then the exotherm between the reductants and oxygen from the cerium causes some of the $NO_x$ to be released from the nearby $NO_x$ storage sites in order to bring the amount of $NO_x$ stored back to the maximum amount that can be stored at the higher surface temperature. Since the reductants have been converted by the oxygen from the cerium, the $NO_x$ is not reduced but is emitted from the trap into the exhaust and out the tailpipe. Another possibility is that the oxygen released from the ceria competes with the released $NO_x$ for the reductants. As a result of this competition, some of the $NO_x$ is not reduced but is emitted from the tailpipe.

Figure 6:
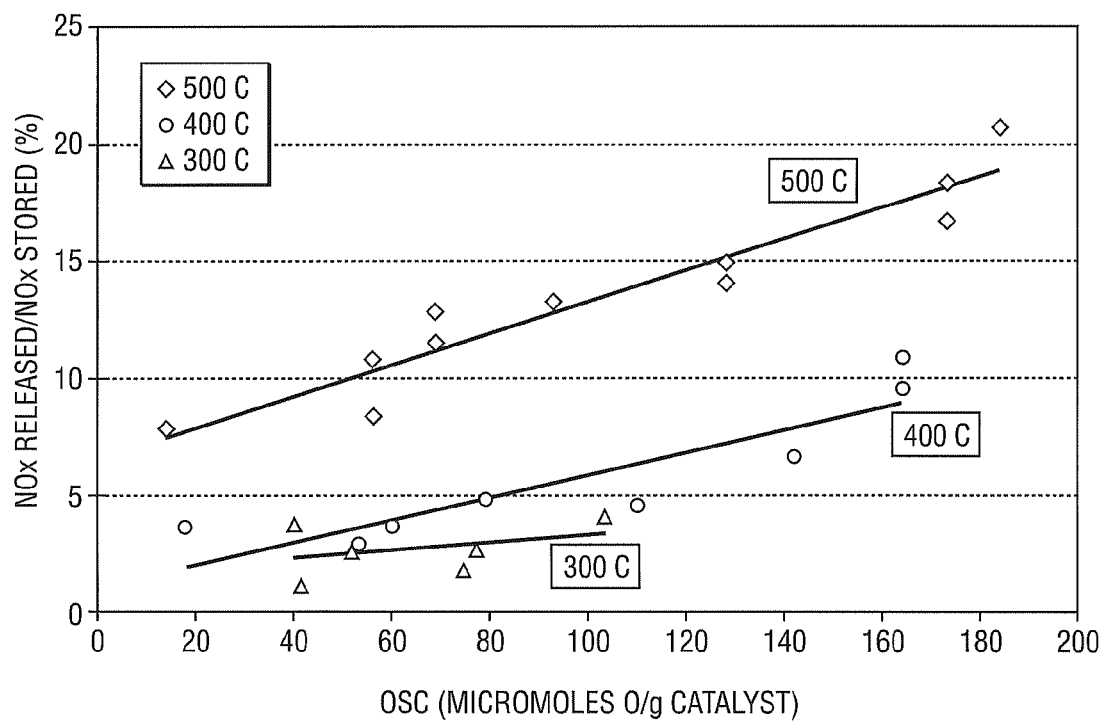
FIG. 6 is a plot of the percent of $NO_x$ release at different temperatures for stabilized traps with different levels of mixed oxide.

With reference to FIG. 6, plots of the percent $NO_x$ release at different temperatures for stabilized traps with different levels of mixed oxide are provided. $NO_x$ traps containing different amounts of ceria were evaluated in a flow reactor for $NO_x$ storage and release at 300° C., 400° C., and 500° C. Prior to testing, these traps were stabilized for 10 minutes at 600° C. in slightly rich exhaust. One test cycle consisted of a five minute lean period alternated with a three minute rich period. A second test cycle consisted of a five minute lean period alternated with a one minute rich period. For both test cycles, the amount of $NO_x$ stored during the lean period and the amount of $NO_x$ released during the rich period were determined, and the $NO_x$ release was then calculated as a percentage of the amount of $NO_x$ stored. The concentration of reductants during the rich purges was 1.2% CO and 0.4% $H_2$, corresponding to an A/F ratio of approximately 14.1 to 1. For samples of these $NO_x$ traps stabilized at 600° C., the oxygen storage capacities were evaluated at 250° C., 350° C., 425° C., 500° C., and 600° C. Since the $NO_x$ storage and release data were collected at 300° C., 400° C., and 500° C., the oxygen storage capacities at 300° C. and 400° C. were estimated by interpolation of the oxygen storage data collected at 250° C., 350° C., and 425° C. For both test cycles, the percentage of $NO_x$ released/$NO_x$ stored is plotted as a function of the normalized oxygen storage capacity of the trap in FIG. 6. At each temperature, the percentage of $NO_x$ release increased as the amount of OSC increased. Moreover, the slopes of the lines increased as the temperature increased. The percentage of $NO_x$ release was fairly low at 300° C., slightly higher at 400° C., and much higher at 500° C. $NO_x$ release was lowest when the OSC was lowest.

In summary, the experiments set forth above demonstrate that the methods of various embodiments of the present invention advantageously provide a number of benefits while minimizing the $NO_x$ release at 300° C., 400° C., and 500° C. Specifically, the optimal value of the OSC of the trap is observed to be about 60 micromoles of oxygen per gram of catalyst at 500° C. It will be appreciated that the OSC of the catalyst decreases as the temperature decreases. Accordingly, by limiting the OSC of the trap to 60 micromoles/gram at 500° C., the OSC will be equal to or less than 60 micromoles/gram across the lean operating window of the $NO_x$ trap (i.e., 250-500° C.) As shown in FIG. 2, a $NO_x$ trap with this approximate level of fresh OSC had much higher stoichiometric $NO_x$ conversion than a non-cerium $NO_x$ trap after the catalysts were aged on a high temperature aging schedule. Finally, as shown in FIG. 3, this approximate level of fresh OSC provided greatly improved sulfur tolerance relative to that of a non-cerium $NO_x$ trap.

While the best mode for carrying out the invention has been described in detail, those familiar with the art to which this invention relates will recognize various alternative designs and embodiments for practicing the invention as defined by the following claims.

The invention claimed is:

1. A catalyst for use in a $NO_x$ trap, the catalyst comprising:
    a precious metal;
    an oxygen storage component in contact with the precious metal in an amount that provides sufficient oxygen storage capacity to limit the $NO_x$ release from the $NO_x$ trap during rich purges to less than 20% of the $NO_x$ that is stored in the $NO_x$ trap across the operating temperature window of the trap, increase the $NO_x$ conversion efficiency under stoichiometric conditions to a value greater than 70%, and increase sulfur tolerance such that the drop in the $NO_x$ storage efficiency averaged over one minute of lean operation is less than 30% when the $NO_x$ trap is contacted with a gaseous composition containing about 9 ppm sulfur dioxide at 400° C. for 10 hours; and
    a $NO_x$ storage material.

2. The catalyst of claim 1 wherein the sufficient amount of the oxygen storage component in contact with the precious metal is attained by limiting the contact between the precious metal catalyst and the oxygen storage component.

3. The catalyst of claim 2 wherein:
    the precious metal is contained in a first layer disposed over a substrate; and
    the oxygen storage component is contained in a second layer disposed over the first layer wherein the contact between the precious metal and the oxygen storage component is limited to an interface between the first layer and the second layer.

4. The catalyst of claim 2 wherein the precious metal and the oxygen storage component are combined in a single layer, the oxygen storage component being in a sufficient concentration that the oxygen storage capacity of the $NO_x$ trap is from about 30 micromoles of oxygen per gram of catalyst to about 90 micromoles of oxygen per gram of catalyst at 500° C.

5. The catalyst of claim 4 wherein the single layer further includes the $NO_x$ storage material.

6. The catalyst of claim 1 wherein the oxygen storage component comprises one or more oxides selected from the group consisting of Rare Earth metal oxides, Group III metal oxides, Group IV metal oxides, and Group V metal oxides.

7. The catalyst of claim 6 wherein the oxygen storage component comprises ceria.

8. The catalyst of claim 6 wherein the amount of oxygen storage component in contact with the precious metal is achieved by reducing the oxygen storage capacity of the oxide.

9. The catalyst of claim 8 wherein the oxygen storage component comprises a pre-sintered oxide.

10. The catalyst of claim 1 wherein the oxygen storage capacity of the $NO_x$ trap at 500° C. is from about 30 micromoles of oxygen per gram of catalyst to about 90 micromoles of oxygen per gram of catalyst.

11. The catalyst of claim 1 wherein the oxygen storage capacity of the $NO_x$ trap at 500° C. is from about 40 micromoles of oxygen per gram of catalyst to about 80 micromoles of oxygen per gram of catalyst.

12. The catalyst of claim 1 wherein the oxygen storage capacity of the $NO_x$ trap at 500° C. is about 60 micromoles of oxygen per gram of catalyst.

13. The catalyst of claim 1 wherein the precious metal is platinum, palladium, rhodium, ruthenium, or mixtures thereof.

14. The catalyst of claim 1 wherein the $NO_x$ storage material comprises a component selected from the group consisting of an alkaline earth metal, an alkali metal, and mixtures thereof.

15. The catalyst of claim 1 wherein the catalyst is applied to a support material by a washcoat, the washcoat comprising:
    10 wt % to about 25 wt % of the oxygen storage component; and
    5 grams per cubic foot to 150 grams per cubic foot of the precious metal.

16. A catalyst for use in a $NO_x$ trap, the catalyst comprising:
    a precious metal;
    an oxygen storage component in contact with the precious metal in an amount such that oxygen storage capacity of the $NO_x$ trap at 500° C. is from about 30 micromoles of oxygen per gram of catalyst to about 90 micromoles of oxygen per gram of catalyst; and
    a $NO_x$ storage material.

17. The catalyst of claim 16 wherein the oxygen storage capacity of the $NO_x$ trap at 500° C. is from about 40 micromoles of oxygen per gram of catalyst to about 80 micromoles of oxygen per gram of catalyst.

18. The catalyst of claim 16 wherein the oxygen storage capacity of the $NO_x$ trap at 500° C. is about 60 micromoles of oxygen per gram of catalyst.

19. The catalyst of claim 16 wherein the oxygen storage component in contact with the precious metal is present in an amount that is attained by limiting the contact between the precious metal catalyst and the oxygen storage component.

20. The catalyst of claim 19 wherein:
    the precious metal is contained in a first layer disposed over a substrate; and
    the oxygen storage component is contained in a second layer disposed over the first layer wherein the contact between the precious metal and the oxygen storage component is limited to an interface between the first layer and the second layer.

21. The catalyst of claim 19 wherein the precious metal and the oxygen storage component are combined in a single layer.

22. The catalyst of claim 21 wherein the single layer further includes the $NO_x$ storage material.

23. The catalyst of claim 16 wherein the oxygen storage component comprises one or more oxides selected from the group consisting of Rare Earth metal oxides, Group III metal oxides, Group IV metal oxides, and Group V metal oxides.

24. The catalyst of claim 23 wherein the oxygen storage component comprises ceria.

25. The catalyst of claim 23 wherein the oxygen storage component in contact with the precious metal is in an amount that is achieved by reducing the oxygen storage capacity of the oxygen storage component.

26. The catalyst of claim 25 wherein the oxygen storage component comprises a pre-sintered oxide.

27. The catalyst of claim 16 wherein the precious metal comprises a component selected from the group consisting of platinum, palladium, rhodium, ruthenium and mixtures thereof.

28. The catalyst of claim 16 wherein the $NO_x$ storage material comprises a component selected from the group consisting of an alkaline earth metal, an alkali metal, and mixtures thereof.

29. A $NO_x$ trap comprising:

a precious metal;

ceria in contact with the precious metal in an amount that provides sufficient oxygen storage capacity to reduce the $NO_x$ release from the $NO_x$ trap during rich purges to less than 20% of the $NO_x$ that is stored in the $NO_x$ trap across the operating temperature window of the $NO_x$ trap, increase $NO_x$ conversion efficiency under stoichiometric conditions to a value greater than 70%, and increase sulfur tolerance such that the drop in the $NO_x$ storage efficiency averaged over one minute of lean operation is less than 30% when the $NO_x$ trap is contacted with a gaseous composition containing about 9 ppm sulfur dioxide at 400° C. for 10 hours; and a $NO_x$ storage material.

30. The $NO_x$ trap of claim 29 wherein the oxygen storage capacity of the catalyst is from about 30 micromoles of oxygen per gram of catalyst to about 90 micromoles of oxygen per gram of catalyst at 500° C.

31. The $NO_x$ trap of claim 29 wherein the oxygen storage capacity of the catalyst is from about 40 micromoles of oxygen per gram of catalyst to about 80 micromoles of oxygen per gram of catalyst at 500° C.

32. The catalyst of claim 29 wherein the oxygen storage capacity of the $NO_x$ trap is about 60 micromoles of oxygen per gram of catalyst at 500° C.

* * * * *